No. 833,089. PATENTED OCT. 9, 1906.
G. L. SCHEUCH.
MIXER AND KNEADER.
APPLICATION FILED MAR. 28, 1906.
3 SHEETS—SHEET 1.
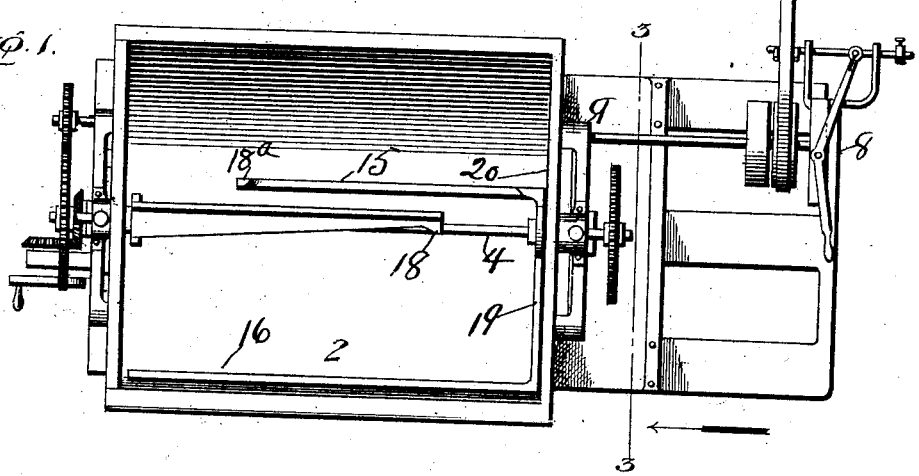
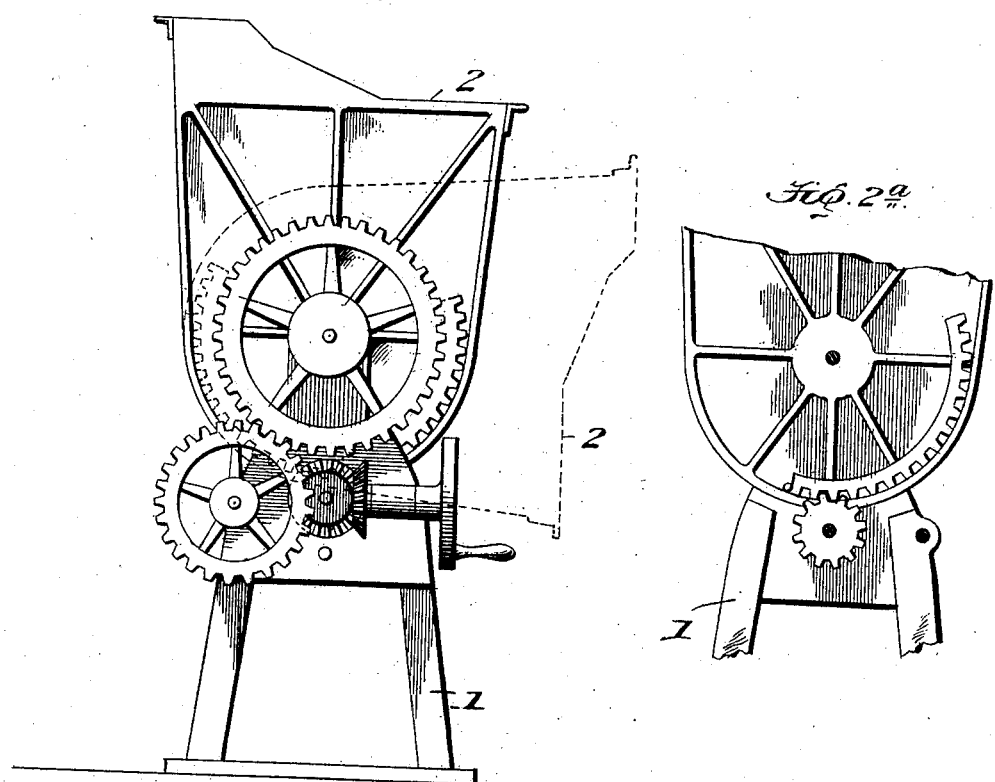
Witnesses
N. C. Healy
Inventor
George Louis Scheuch
By Theodore Mungen
Attorney No. 833,089. PATENTED OCT. 9, 1906.
G. L. SCHEUCH.
MIXER AND KNEADER.
APPLICATION FILED MAR. 28, 1906.
3 SHEETS—SHEET 2.
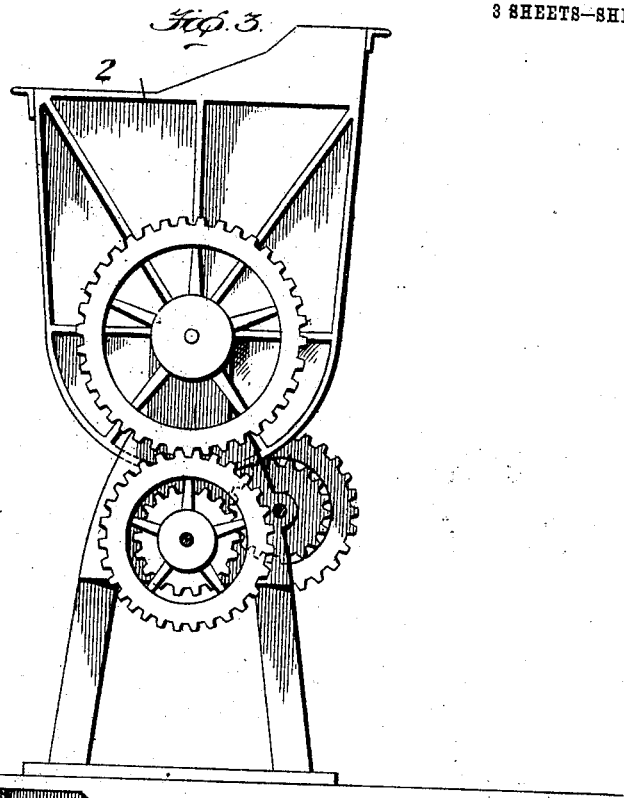
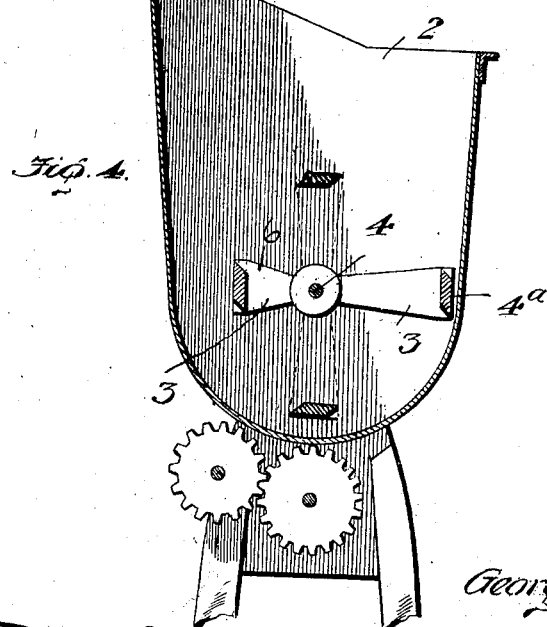
Witnesses
Inventor
George Louis Scheuch
By Theodore Munzen
Attorney No. 833,089. PATENTED OCT. 9, 1906.
G. L. SCHEUCH.
MIXER AND KNEADER.
APPLICATION FILED MAR. 28, 1906.
3 SHEETS—SHEET 3.
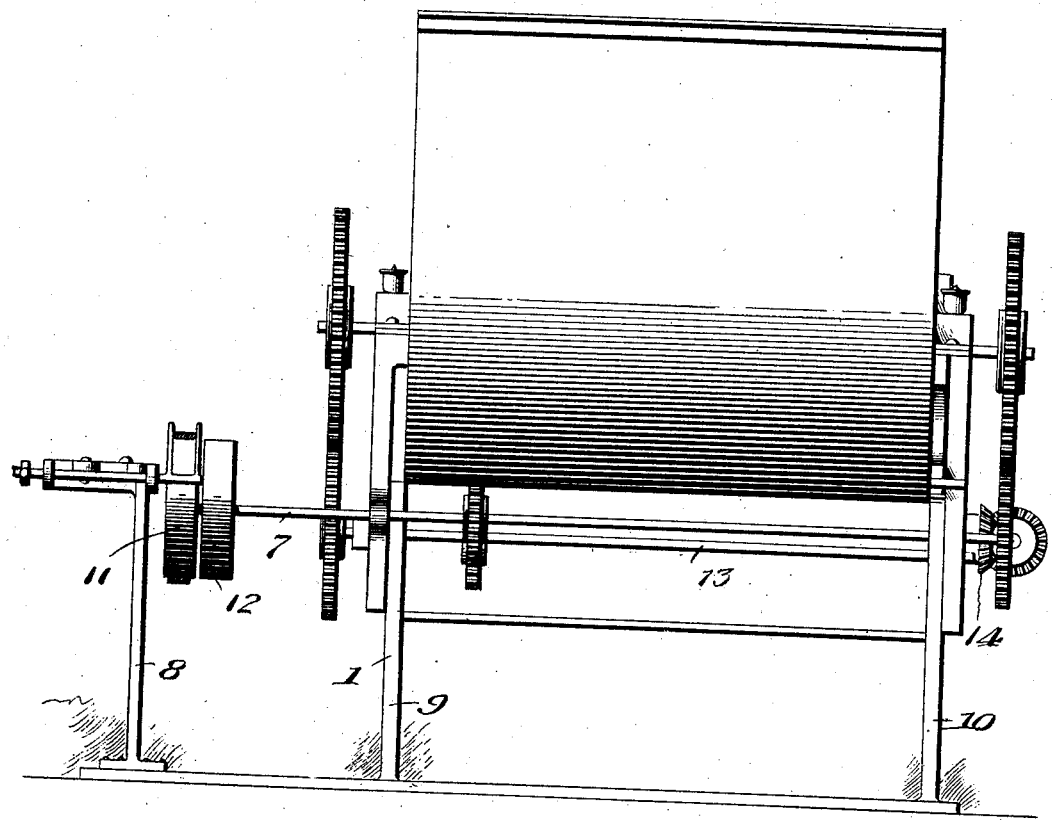
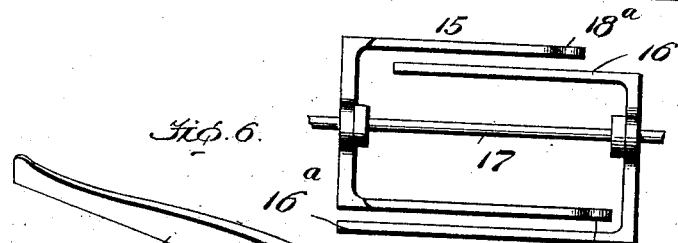
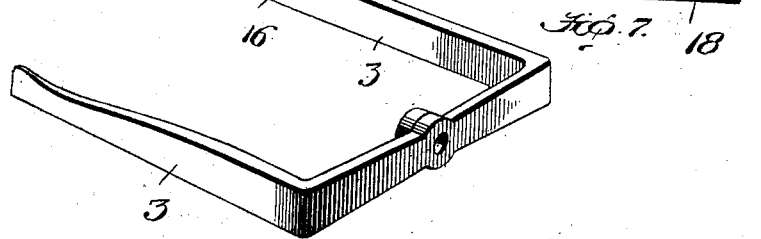

UNITED STATES PATENT OFFICE.

GEORGE LOUIS SCHEUCH, OF WASHINGTON, DISTRICT OF COLUMBIA, ASSIGNOR OF ONE-THIRD TO MICHAEL HOLZBEIERLEIN.

MIXER AND KNEADER.

No. 833,089. Specification of Letters Patent. Patented Oct. 9, 1906.

Application filed March 28, 1906. Serial No. 308,601.

*To all whom it may concern:*

Be it known that I, GEORGE LOUIS SCHEUCH, a citizen of the United States, residing at 1826 Eighth street northwest, Washington, District of Columbia, have invented certain new and useful Improvements in Mixers and Kneaders, of which the following is a specification.

The invention relates to a novel and useful machine for the mixing of flour and making the same into dough or paste and kneading the paste formed into a proper consistency for the production of bread, biscuit, or the like, also obviating the use of the hand-knife heretofore or in most instances used to sever the dough from the wall of the receptacle where the dough becomes impacted against said wall during the operation of the machine in mixing and kneading the flour into dough.

The novelty consists in the construction and novel combinations of the parts of the machine, as will be hereinafter fully described and claimed.

In the drawings, Figure 1 is a top plan view of a device of this class embodying my invention. Fig. 2 is an end view showing the supporting-stand, the trough in the initial position and also in dotted lines in the discharging position. Fig. 2ª is an end view of the trough, its support, the arc-rack within the trough, and the mounted cog-wheel upon the end of the driven shaft, which cog-wheel engages the toothed arc at the right front end portion of the trough. Fig. 3 is an end elevation of the machine, showing the driven gearing. Fig. 4 is a vertical sectional view, partly in elevation, showing the stand partially broken, the trough in section, the mixing-blades mounted upon a shaft journaled therein. Fig. 5 is a side elevation of the device, showing the gearings through which motion is transmitted to the mixing-blades to accomplish the result of mixing and kneading the dough. Fig. 6 is a detail view of the separating and separable beaters. Fig. 7 is a plan view of one of the rotary beaters forming the two that rotate in opposite directions to mix and knead the dough.

The device is designed for use particularly in bread-making where dough-troughs are used in kneading the dough automatically during the cumulative operation of the machine.

Referring by numerals to the accompanying drawings, 1 is the stand, base, or support of the operative mechanism. While the device is shown as a power operative device, it also is shown in Fig. 2 as a hand operative device. The power applied controls only the productive capacity of the machine—that is, between hand-power and mechanical power, such as steam or electrical power.

2 is an open-mouth trough suspended in bearings in standards or supports, so that it may occupy both a vertical and a horizontal position at different manipulations of the machine, one while the flour is being mixed into dough and the other when the mixed dough is being separated from the mass of dough formed in the trough and removed therefrom.

The mixing blades or arms 15 16 are mounted upon a driven shaft 4, having bearings in the end supports of the machine, and these mixing-blades are so geared that they when operated revolve or move in opposite directions. Their knife-edges and their angular end bends 4ª are similar, with the exception than the arm 6 of the four arms is made considerably shorter than the others in order that it may operate on an inner circle upon the volume of flour within the receptacle wherein it is to be subjected to liquid contact and by mixing be converted into dough which when formed is thereafter removed from the receptacle or trough and conveyed to the place of deposit to be subjected to future or immediate treatment to convert it into the market product. Where steam-power or electric power is employed, the driving-shaft 7 is supported in bearings in vertical standards 8 9, and belt-pulleys 11 and 12 are mounted upon the driving-shaft 7 to impart motion to the trough to hold it or change it from the vertical or receiving position, or vice versa.

The driving-shaft 13 is journaled in the standards that support the trough and has miter-gear 14, engaging larger gear-arms.

The mixing and kneading arms 15 and 16 are mounted on the driven shaft 17 and when power is applied to them to thoroughly mix the flour and afterward knead the dough formed from such mixing. The mixing and kneading arms 15ª and 16 are rotating arms, having flat enlargements 18 18ª at their free or disconnected ends, and when these arms or blades 15ª, 16, 16ª, 18, and 18ª are rotated or driven in opposite directions thus thoroughly mix the dough, leave it ready for removal. The end of the longer blade 16ª scrapes the dough which may become impacted thereon from the interior sides of the receptacle during the revolution of the mixer, and thereby prevents accumulation of the dough at the side of the receptacle toward or against which it is forced during the operation of mixing and kneading, which dough if permitted to remain would retard the operation of the machine. This cleaning or removal of this dough thus adhering has heretofore had to be accomplished with a knife in the hands of the attendant, which has resulted in injury to the hand of the operator or attendant, and in most instances very serious injury has been incurred to the hand thus employed.

The radial portion 19 of the mixing-arms comes during its revolution in scraping proximity to the end wall 20 of the dough-receptacle and during the operation of the machine scrapes said end wall 20 and prevents the dough from adhering to the inner face of said end wall 20, thus obviating the use of the hand-knife heretofore employed to clean said end wall from impacted dough.

Having fully described my invention, what I claim, and desire to secure by Letters Patent, is—

1. In a dough mixing and kneading machine, the combination of a tiltable dough-receptacle, of radially-disposed mixing-blades provided with angular end bends and mounted upon longitudinal shafts within said receptacle, the integral end bends extending in the direction of the length of said receptacle, and gearing for rotating said shafts in opposite directions and causing said blades with their end bends to intersect during the revolutions of said shafts to thoroughly mix the flour into dough, substantially as specified.

2. In a dough mixer and kneader, the combination with the tiltable dough-receptacle suitably supported upon a driven shaft, of a mixer composed of flat, flared arms provided with angular integral end bends, one of said flat flared arms being much shorter than the others in order that its end bend may work closer to their common supporting-shaft 4; substantially as specified.

In testimony whereof I have signed my name to this specification in the presence of two subscribing witnesses.

GEORGE LOUIS SCHEUCH.

Witnesses:
J. F. SLIFER,
E. J. HORIGAN.